(No Model.)
E. H. BOURNE.
ROCK DRILL CHUCK.
No. 603,101. Patented Apr. 26, 1898.
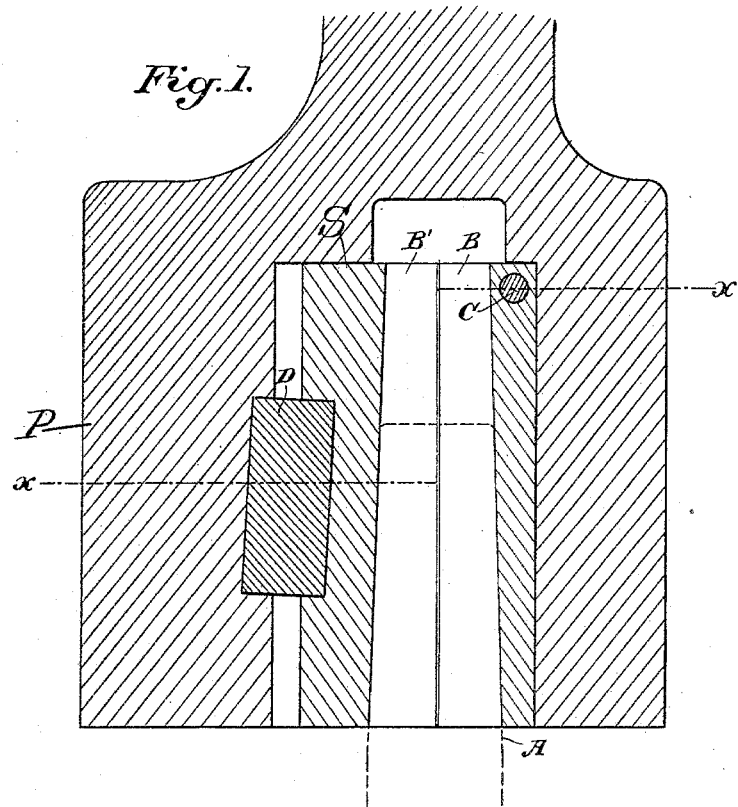
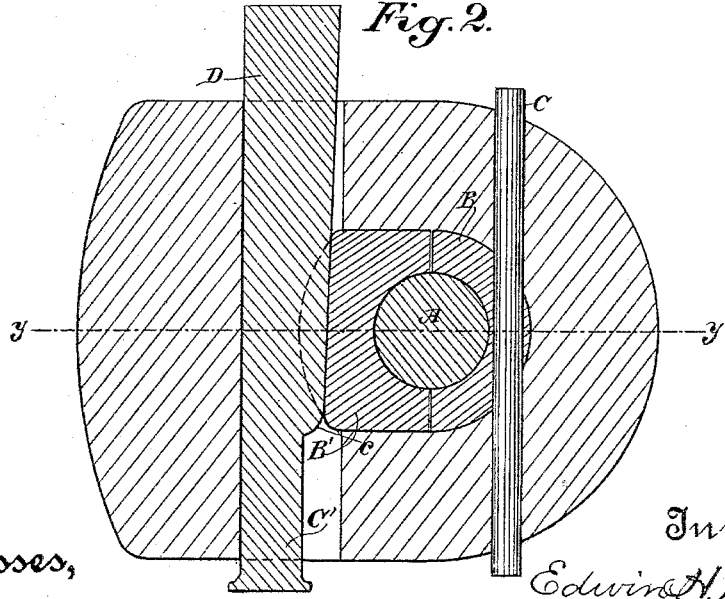
Witnesses:
Inventor,
Edwin H. Bourne
By Dewey & Co.
Attys

UNITED STATES PATENT OFFICE.

EDWIN H. BOURNE, OF DOWNIEVILLE, CALIFORNIA.

ROCK-DRILL CHUCK.

SPECIFICATION forming part of Letters Patent No. 603,101, dated April 26, 1898.

Application filed July 8, 1897. Serial No. 643,837. (No model.)

*To all whom it may concern:*

Be it known that I, EDWIN H. BOURNE, a citizen of England, residing at Downieville, county of Sierra, State of California, have invented an Improvement in Rock-Drill Chucks; and I hereby declare the following to be a full, clear, and exact description of the same.

My invention relates to a chuck or holder for rock-drills which is especially designed to automatically lock the drill in place by the act of introducing and starting it to work and to provide a means for easily releasing when it is to be removed.

It consists in details of construction which will be more fully explained by reference to the accompanying drawings, in which—

Figure 1 is a vertical section of my device on line $y\ y$ of Fig. 2. Fig. 2 is a transverse section on line $x\ x$ of Fig. 1.

Various devices have been employed for fixing the shanks of rock-drills in the end of the movable driving head or piston; but these are difficult to keep tight and more difficult to release for the removal of the drills.

In my device the drill shank or head, which is usually made of hexagonal steel with a suitable form of cutting-bit at one end, is tapered, as shown at A, at the upper end.

The drill-socket is made of sufficient size to receive the semicylindrical segments B B', the segment B being permanently fixed in one side of the chamber, which is formed to receive these segments, and the other segment B' being fitted so as to be movable to increase the distance between itself and the part B. The socket consists of a single integral piece and extends at one side of the center of its shank a greater distance than at the opposite side to provide a thickened portion P, against which the wedge-shaped drive-key is seated, said socket having also an internal shoulder at S to form an abutment for the ends of the segments. The part B is permanently fixed by a pin C, passing through a hole made through its upper portion and adapted to coincide with a similar hole made through the drill-socket. The part B' has a channel formed in the back adapted to receive the wedge-shaped key D, which passes transversely through the socket-piece behind the part B' of the chuck. These parts are ordinarily closed up against each other, the wedge being driven in sufficiently tight, and the inner portion of the segment is bored, tapering to correspond with the tapering shape of the upper end A of the drill-shank. It is then only necessary to insert the drill with a little push, which causes it to bind in the socket, and as soon as the drill is started the blows upon the rock will lock it firmly in place.

Whenever it is desired to remove the drill the key D is driven backward, so as to relieve the pressure upon the segment B', and the latter can then be moved away from the segment B, so as to allow the drill to be readily removed.

In the present case I have shown the key as having an offset at $c$, so that the end C' is of less diameter than the part which normally lies behind the segment B', so that when the key is driven backward this reduced portion is brought behind the segment and thus allows it to be moved sufficiently for the easy removal of the drill. Various devices may be employed for locking this segment or allowing it to be moved backwardly; but I have found that shown in the present arrangement to be very effective. The channel for the key is formed partly in the segment and partly in the body of the holder, so that when it has been loosened the segment will still remain in place and not fall out.

Having thus described my invention, what I claim as new, and desire to secure by Letters Patent, is—

1. An improved drill-holder consisting of a drill-socket, a segment in one side of said socket having an inclined or tapered inner wall and a straight outer wall to fit closely for its entire length the corresponding wall of the socket, a second segment in the opposite side of the socket, having an inclined or tapered inner wall and a straight outer wall, the inner ends of both segments abutting against an internal shoulder in the drill-socket, a pin driven transversely through the upper end of the first-named segment and the socket, and permanently securing said segment in place, and a single wedge-shaped key centrally placed behind the other segment and having a portion of reduced diameter which is adapted to be moved in line with the said movable segment to release the drill-shank, said movable segment and socket having adjacent faces channeled to receive said key whereby the segment will remain in place when the key is moved to bring its reduced portion behind the same, substantially as and for the purpose specified.

2. An improved drill-holder consisting of a drill-socket formed as a single integral structure and extended at one side of the center of its shank a greater distance than at the opposite side, to form a thickened portion, said socket having also an internal shoulder; opposing segments in said socket each having a tapering inner wall, one of said segments being permanently secured in the socket and the other readily removable, a pin passing through one end portion of the permanent segment and a single wedge-shaped drive-key centrally located behind the movable segment and seated in corresponding recessed portions in the contiguous faces of the segment and the inner wall of the socket whereby the movable segment is secured and the drill locked in place.

In witness whereof I have hereunto set my hand.

EDWIN H. BOURNE.

Witnesses:
S. H. NOURSE,
JESSIE C. BRODIE.